US008611811B2

(12) United States Patent
Youn et al.

(10) Patent No.: US 8,611,811 B2
(45) Date of Patent: Dec. 17, 2013

(54) METHOD OF PERFORMING RANGING THROUGH RELAY STATION AND SUPPORTING THEREOF

(75) Inventors: Ae Ran Youn, Gyeonggi-do (KR); Ki Seon Ryu, Seoul (KR); Du Hyun Mun, Seoul (KR); Beom Joon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 522 days.

(21) Appl. No.: 12/281,296

(22) PCT Filed: Mar. 2, 2007

(86) PCT No.: PCT/KR2007/001049
§ 371 (c)(1),
(2), (4) Date: Dec. 22, 2008

(87) PCT Pub. No.: WO2007/100224
PCT Pub. Date: Sep. 7, 2007

(65) Prior Publication Data
US 2010/0009624 A1    Jan. 14, 2010

(30) Foreign Application Priority Data

Mar. 2, 2006 (KR) .................. 10-2006-0020138

(51) Int. Cl.
*H04B 17/02* (2006.01)
(52) U.S. Cl.
USPC ............... 455/9; 455/7; 455/13.2; 455/67.11; 455/115.4; 455/515
(58) Field of Classification Search
None
See application file for complete search history.

(56) References Cited

U.S. PATENT DOCUMENTS

| 7,466,682 B1* | 12/2008 | Ribas et al. ................... 370/342 |
| 2006/0009242 A1* | 1/2006 | Ryu et al. ........................ 455/458 |
| 2007/0184826 A1 | 8/2007 | Park et al. |
| 2007/0201392 A1* | 8/2007 | Ramachandran ............. 370/315 |

FOREIGN PATENT DOCUMENTS

| EP | 1324509 A2 | 7/2003 |
| JP | 2003-258719 | 9/2003 |
| JP | 2007-525927 | 9/2007 |
| KR | 1020050040688 | 5/2005 |
| KR | 1020060009289 | 1/2006 |
| KR | 1020060012849 | 2/2006 |
| WO | 03/003670 A1 | 1/2003 |
| WO | 2007/078138 A2 | 7/2007 |

OTHER PUBLICATIONS

G. Shen et al., "Recommendation on 802.16 MMR with Backward Compatibility", IEEE C802.16mmr-05/023, Nov. 2005.

* cited by examiner

*Primary Examiner* — Yuwen Pan
*Assistant Examiner* — Fanghwa Wang
(74) *Attorney, Agent, or Firm* — Lee, Hong, Degerman, Kang & Waimey (57) ABSTRACT

A method of performing ranging through a relay station (RS) and supporting thereof is disclosed. If ranging is performed in a system which performs communication between a mobile station and a base station through relay of a relay station, the ranging is performed under the leading of the relay station. In other words, if the relay station determines whether ranging between the mobile station and the relay station is required and also determines transmission parameter adjustment values and reports the determined result to the base station, the base station performs the ranging in such a manner that it prepares a message suitable for a specific format and forwards the message to the mobile station through the relay station.

9 Claims, 5 Drawing Sheets

METHOD OF PERFORMING RANGING THROUGH RELAY STATION AND SUPPORTING THEREOF

CROSS-REFERENCE TO RELATED APPLICATIONS

This application is a national stage application of International Application No. PCT/KR2007/001049, filed on Mar. 2, 2007, which claims the benefit of earlier filing date and right of priority to Korean Application No. 10-2006-0020138, filed on Mar. 2, 2006.

TECHNICAL FIELD

The present invention relates to a method of performing ranging in a communication system, and more particularly, to a method of performing ranging through a relay station (RS) and supporting thereof.

BACKGROUND ART

Ranging in a communication system means that a mobile station adjusts transmission parameters (frequency offset, time offset, transmission power, and the like) for uplink communication with a base station when an initial network registration procedure is performed or if necessary to continue such uplink communication with the base station even after the network registration procedure is performed.

A wireless metropolitan area network (Wireless MAN) system according to the IEEE 802.16 can perform ranging of two types below. The first type is initial ranging corresponding to the case where a mobile station (MS) performs synchronization with a new base, station (BS) to connect with the base station in such a way to be first powered on or perform handover. The second type is periodic ranging corresponding to the case where a base station periodically performs synchronization with the mobile station at the request of the mobile station or even at no request of the mobile station when readjustment of synchronization with the mobile station is needed.

First, the procedure of the initial ranging will be described below.

1) The mobile station receives uplink transmission parameters after acquiring downlink synchronization.

2) The mobile station selects one of slots of ranging subchannels allocated within a frame structure and forwards ranging request message (RNG-REQ) to the base station using an initial ranging code.

3) The base station receives the ranging request message and forwards all of required transmission parameter adjustment values and status information to the mobile station through ranging response message (RNG-RSP).

4) If the status information indicates 'success,' the base station allocates uplink bandwidth for CDMA Allocation IE required to allow the mobile station to transmit the ranging request message (RNG-REQ). If the status information indicates 'continue,' the mobile station returns to the step 2) and repeats the steps until the status information indicates 'success.'

Next, the procedure of the periodic ranging will be described below.

1) The mobile station selects a periodic ranging slot and a periodic ranging code and transmits the ranging code through the selected ranging slot.

2) The base station broadcasts the received ranging code and the ranging slot through the ranging response message (RNG-RSP). The ranging response message (RNG-RSP) includes status information and information (time, power, and frequency correction) required for adjustment.

3) If the status information indicates 'continue,' the mobile station reselects ranging slot and ranging code and repeats the steps 1) and 2).

4) In ranging method of an orthogonal frequency division multiple access (OFDMA) system, a timer for periodic ranging is controlled by the mobile station.

In case of the periodic ranging, the base station determines the channel status with the mobile station, and if it is determined that the ranging is required, the base station can request the ranging through an unsolicited ranging response message (RNG-RSP) even in the case that the ranging request message (RNG-REQ) is not requested from the base station.

Hereinafter, the ranging operation performed during initialization of the mobile station in a single carrier and orthogonal frequency division multiple (OFDM) mode of a wireless metropolitan area network (Wireless MAN) system will be described.

The base station allocates a contention based initial ranging field to the mobile stations through an uplink map. Each of the mobile stations forwards the ranging request message which includes its MAC address to the base station using the ranging field of the uplink. If the ranging request message received in the base station cannot be decoded due to collision with another ranging request message transmitted from another mobile station, the base station forwards ranging response message which includes the ranging field and a frame number received through the ranging request message along with the uplink transmission parameter adjustment values.

If the ranging request message received in the base station can be decoded, the base station forwards the uplink transmission parameter adjustment values of the mobile station through the ranging response message. If the uplink transmission parameters of the mobile station are successfully adjusted, the base station forwards ranging response message to the mobile station, wherein the ranging response message includes a basic management connection identifier (CID) and a primary management connection identifier (CID). The base station allocates an uplink band through the uplink map to allow the mobile station to transmit the ranging request message. At this time, the base station allocates a non-contention based uplink band through the basic management connection identifier of the mobile station. The mobile station which has been allocated with the uplink band transmits the ranging request message, while the base station transmits the ranging response message in response to the ranging request message of the mobile station. In this case, coding and modulation modes of a downlink burst between the mobile station and the base station may be adjusted.

Hereinafter, the ranging operation performed during initialization of the mobile station in an OFDMA wireless metropolitan area network (Wireless MAN) system will be described.

The OFDMA wireless MAN system performs an uplink bandwidth request and ranging request using CDMA codes to allow the mobile station to adjust uplink transmission parameters. The base station forwards CDMA code sets for ranging and bandwidth request to the mobile stations in a broadcast type through an uplink channel descriptor (UCD) message. The mobile station optionally selects a suitable ranging code from the CDMA codes acquired from the UCD message and transmits the selected ranging code through the uplink field allocated for ranging. Table 1 and Table 2 respectively illustrate the UCD message and examples of TLV parameters related to the ranging and bandwidth request included in the UCD message.

The base station allocates a contention based ranging field to the mobile stations through an uplink map information element included in an uplink map. Each of the mobile stations allocates the ranging field in such a way to divide it into initial ranging codes, handover ranging codes, periodic ranging codes, and bandwidth request codes depending on ranging service.

The base station which has received the ranging codes from the mobile station sets transmission power adjustment values, time and frequency adjustment values, ranging status information (success and fail), and the like, which are required for uplink transmission synchronization of the mobile station, through ranging response message (RNG-RSP) as shown in Table 3 and forwards them.

TABLE 1

| Syntax | Size | Notes |
|---|---|---|
| UCD_Message_Format( ) { | | |
| Management Message Type = 0 | 8 bits | |
| Configuration Change Count | 8 bits | |
| ranging Backoff Start | 8 bits | |
| ranging Backoff End | 8 bits | |
| Request Backoff Start | 8 bits | |
| Request Backoff End | 8 bits | |
| TLV Encoded information for the overall channel | variable | TLV specific |
| Begin PHY Specific Section { | | See applicable PHY section. |
| for(i= 1; i <= n; i++) { | | For each uplink burst profile 1 to n. |
| Uplink_Burst_Profile | variable | PHY specific |
| } | | |
| } | | |
| } | | |
| } | | |

TABLE 3

| Syntax | Size | Notes |
|---|---|---|
| RNG-RSP_Message_Format( ) { | | |
| Management Message Type = 5 | 8 bits | |
| Uplink Channel ID | 8 bits | |
| TLV Encoded Information | variable | TLV specific |
| } | | |

Table 4 illustrates examples of TLV parameters included in the ranging response message.

TABLE 2

| Name | Type (1 byte) | Length | Value |
|---|---|---|---|
| Initial ranging Codes | 150 | 1 | Number of initial ranging CDMA codes. Possible values are 0-255.a |
| Periodic ranging codes | 151 | 1 | Number of periodic ranging CDMA codes. Possible values are 0-255.a |
| Handover ranging codes | 194 | 1 | Number of handover ranging CDMA codes. Possible values are 0-255.a |
| Bandwidth request codes | 152 | 1 | Number of bandwidth request codes. Possible values are 0-255.a |
| Periodic ranging backoff start | 153 | 1 | Initial backoff window size for periodic ranging contention, expressed as a power of 2. Range: 0-15 (the highest order bits shall be unused and set to 0). |
| Periodic ranging backoff end | 154 | 1 | Final backoff window size for periodic ranging contention, expressed as a power of 2. Range: 0-15 (the highest order bits shall be unused and set to 0). |
| Start of ranging codes group | 155 | 1 | Indicates the starting number, S, of the group of codes used for this uplink. All the ranging codes used on this uplink will be between S and ((S + N + M + L + O) mod 256). Where, N is the number of initial-ranging codes. M is the number of periodic-ranging codes. L is the number of bandwidth-request codes. O is the number of initial-ranging codes. M is the number of handover-ranging codes. The range of values is 0 S ≤≤ 255 |

TABLE 4

| Name | Type (1 byte) | Length | Value (variable-length) |
|---|---|---|---|
| Timing Adjust | 1 | 4 | Tx timing offset adjustment (signed 32-bit). The time required to advance SS transmission so frames arrive at the expected time instance at the BS. Units are PHY specific (see 10.3). |
| Power Level Adjust | 2 | 1 | Tx Power offset adjustment (signed 8-bit, 0.25 dB units) Specifies the relative change in transmission power level that the SS is to make in order that transmissions arrive at the BS at the desired power. When subchannelization is employed, The subscriber shall interpret the power offset adjustment as a required change to the transmitted power density. |
| Offset Frequency Adjust | 3 | 4 | Tx frequency offset adjustment (signed 32-bit, Hz units) Specifies the relative change in transmission frequency that the SS is to make in order to better match the BS. (This is fine-frequency adjustment within a channel, not reassignment to a different channel.) |
| Ranging Status | 4 | 1 | Used to indicate whether uplink messages are received within acceptable limits by BS. 1 = continue, 2 = abort, 3 = success, 4 = re-range |
| Ranging code attributes | 150 | 4 | Bits 31:22 - Used to indicate the OFDM time symbol reference that was used to transmit the ranging code. Bits 21:16 - Used to indicate the OFDMA subchannel reference that was used to transmit the ranging code. Bits 15:8 - Used to indicate the ranging code index that was sent by the SS. Bits 7:0 - The 8 least significant bits of the frame number of the OFDMA frame where the SS sent the ranging code. |
| Downlink Operational Burst Profile | 7 | 2 | This parameter is sent in response to the RNG-REQ Requested Downlink Burst Profile parameter. Byte 0: Specifies the least robust DIUC that may be used by the BS for transmissions to the SS. Byte 1: Configuration Change Count value of DCD defining the burst profile associated with DIUC. |
| SS MAC Address | 8 | 6 | SS MAC Address in MAC-48 format |
| Basic CID | 9 | 2 | Basic CID assigned by BS at initial access. |
| Primary Management CID | 10 | 2 | Primary Management CID assigned by BS at initial access. |

If it is determined that the uplink transmission parameters have been successfully adjusted, the base station sets the ranging status to 'success' and allocates an uplink bandwidth to a corresponding mobile station through an uplink information element (CDMA_Allocation_IE) as shown in Table 5, thereby allowing the mobile station to transmit the ranging request message.

TABLE 5

| Syntax | Size | Notes |
|---|---|---|
| CDMA_Allocation_IE( ) { | | |
| Duration | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| Ranging Code | 8 bits | |
| Ranging Symbol | 8 bits | |
| Ranging subchannel | 7 bits | |
| BW request mandatory | 1 bit | 1 = yes, 0 = no |
| } | | |

The mobile station which has been allocated with the uplink field transmits ranging request message (RNG-REQ) as shown in Table 6 to the base station along with its identifier (MAC address). The base station which has received the ranging request message allocates management CIDs to the corresponding mobile station in such a way to forward the ranging response message, which includes basic management CID and primary management CID as shown in Table 8, to the corresponding mobile station.

TABLE 6

| Syntax | Size | Notes |
|---|---|---|
| RNG-REQ_Message_Format( ) { | | |
| Management Message Type = 4 | 8 bits | |
| Downlink Channel ID | 8 bits | |
| TLV Encoded Information | variable | TLV specific |
| } | | |

Table 7 and Table 8 illustrate examples of TLV parameters included in the ranging request message of Table 6.

TABLE 7

| Name | Type (1 byte) | Length | Value (variable-length) |
|---|---|---|---|
| Requested Downlink Burst Profile | 1 | 1 | Bits 0-3: DIUC of the downlink burst profile requested by the SS for downlink traffic. Bits 4-7: 4 LSB of Configuration Change Count value of DCD defining the burst profile associated with DIUC. |
| SS MAC Address | 2 | 6 | The MAC address of the SS |
| Ranging Anomalies | 3 | 1 | A parameter indicating a potential error condition detected by the SS during the ranging process. Set-ting the bit associated with a specific condition indicates that the condition exists at the SS. Bit #0 SS already at maximum power. Bit #1 SS already at minimum power. Bit #2 Sum of commanded timing adjustments is too large. |
| AAS broadcast capability | 4 | 1 | 0 = SS can receive broadcast messages 1 = SS cannot receive broadcast messages |

TABLE 8

| Name | Type (1 byte) | Length | Value (variable-length) |
|---|---|---|---|
| Downlink Operational Burst Profile | 7 | 2 | This parameter is sent in response to the RNG-REQ Requested Downlink Burst Profile parameter. Byte 0: Specifies the least robust DIUC that may be used by the BS for transmissions to the SS. Byte 1: Configuration Change Count value of DCD defining the burst profile associated with DIUC. |
| SS MAC Address | 8 | 6 | SS MAC Address in MAC-48 format |
| Basic CID | 9 | 2 | Basic CID assigned by BS at initial access. |
| Primary Management CID | 10 | 2 | Primary Management CID assigned by BS at initial access. |

As described above, the mobile station forwards the ranging request message to the base station through the contention based uplink ranging field during network registration, and the base station transmits the ranging response message to the corresponding mobile station. This procedure is referred to as the initial ranging. If the mobile station performs ranging through the contention based uplink field, it may not receive the ranging response from the base station as collision with another mobile station which performs ranging occurs. If the mobile station forwards the ranging request and does not receive the ranging response from the base station for a certain time period, the corresponding mobile station retransmits the ranging request to the base station.

Furthermore, the base station may allocate the ranging field to a specific mobile station so that the mobile station may perform non-contention based ranging. If the mobile station performs handover to another base station in a normal action state, the mobile station should perform ranging with a corresponding base station. At this time, a service base station notifies a handover target base station (target BS) of handover of the mobile station, and the target base station can allocate the non-contention based ranging field using an uplink map information element (fast ranging IE) as shown in Table 9, wherein the non-contention based ranging field is ranging field where the corresponding mobile station can perform ranging during actual handover. Also, the mobile station can perform the ranging procedure with the handover target base station through the allocated ranging field.

TABLE 9

| Syntax | Size | Notes |
|---|---|---|
| Fast_ranging_IE { | | |
| Extended UIUC | 4 bits | 0x06 |
| Length | 4 bits | Length = 0x0b |
| HO ID indicator | 1 bit | 0: MAC Address is present 1: HO ID is present |
| Reserved | 3 bits | Shall be set to zero |
| if (HO ID indicator == 1) { | | |
| HO ID | 8 bits | |
| Reserved | 40 bits | Shall be set to zero |
| } else { | | |
| MAC address | 48 bits | MS MAC address as provided on the RNG-REQ message on initial system entry |
| } | | |
| UIUC | 4 bits | URIC ≠ 15. A four-bit code used to define the type of uplink access and the burst type associated with that access. |
| if (UIUC == 12) { | | |
| OFDMA Symbol offset | 8 bits | |
| Subchannel offset | 7 bits | |
| No. OFDMA Symbols | 7 bits | |
| No. Subchannels | 7 bits | |
| Ranging Method | 2 bits | 0b00 - Initial ranging over two symbols 0b01 - Initial ranging over four symbols 0b10 - BW Request/Periodic ranging over one symbol 0b11 - BW Request/Periodic ranging over three symbols |
| Reserved | 1 bit | Shall be set to zero |
| } else { | | |
| Duration | 10 bits | In OFDMA slots (see 8.4.3.1) |

TABLE 9-continued

| Syntax | Size | Notes |
|---|---|---|
| Repetition coding indication | 2 bits | 0b00 - No repetition coding<br>0b01 - Repetition coding of 2 used<br>0b10 - Repetition coding of 4 used<br>0b11 - Repetition coding of 6 used |
| Reserved | 20 bits | Shall be set to zero |
| }<br>} | | |

Figure 1:
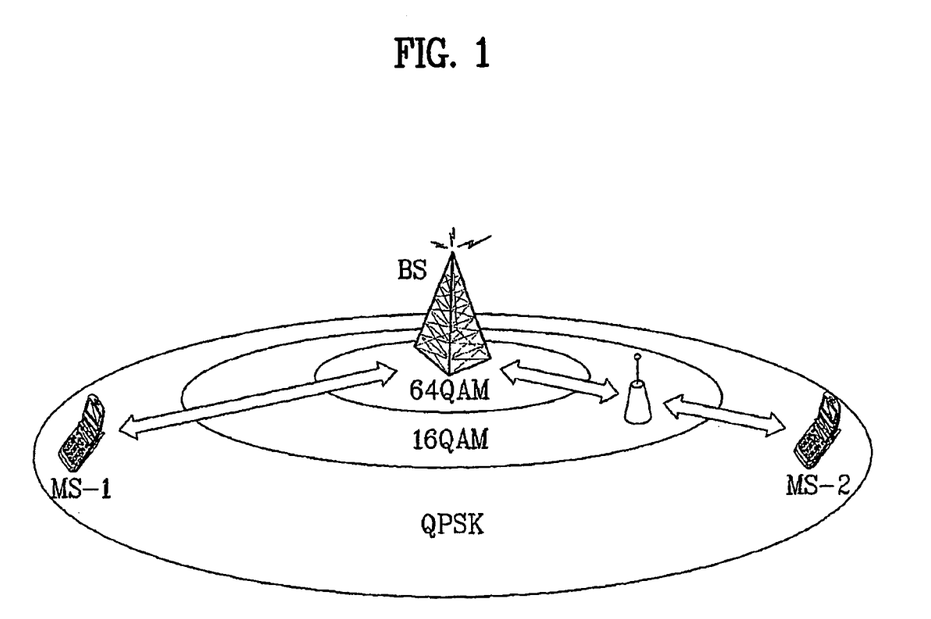
FIG. 1 illustrates an example of networking using a relay station.

Hereinafter, a networking method using a relay station in a wireless metropolitan area network (wireless MAN) system will be described. FIG. 1 illustrates an example of networking using a relay station.

In IEEE 802.16, studies of multi-hop relay networking are being made to improve throughput by allowing the wireless MAN system to extend service coverage of the base station and provide higher signal quality to a mobile station in a shadow area.

In the IEEE 802.16, for relay networking, a frame structure of a physical layer has been improved, and a new protocol of a MAC layer has been additionally provided. According to main features of the IEEE 802.16, a tree structure where a final destination of a data path which is relayed is used as a base station is compatible with the existing point to multipoint (PMP) mode, and a relay mode and the PMP mode use the same frequency band or different frequencies adjacent to each other. Examples of the relay station include a fixed relay station, a nomadic relay station, and a mobile relay station.

Figure 2:
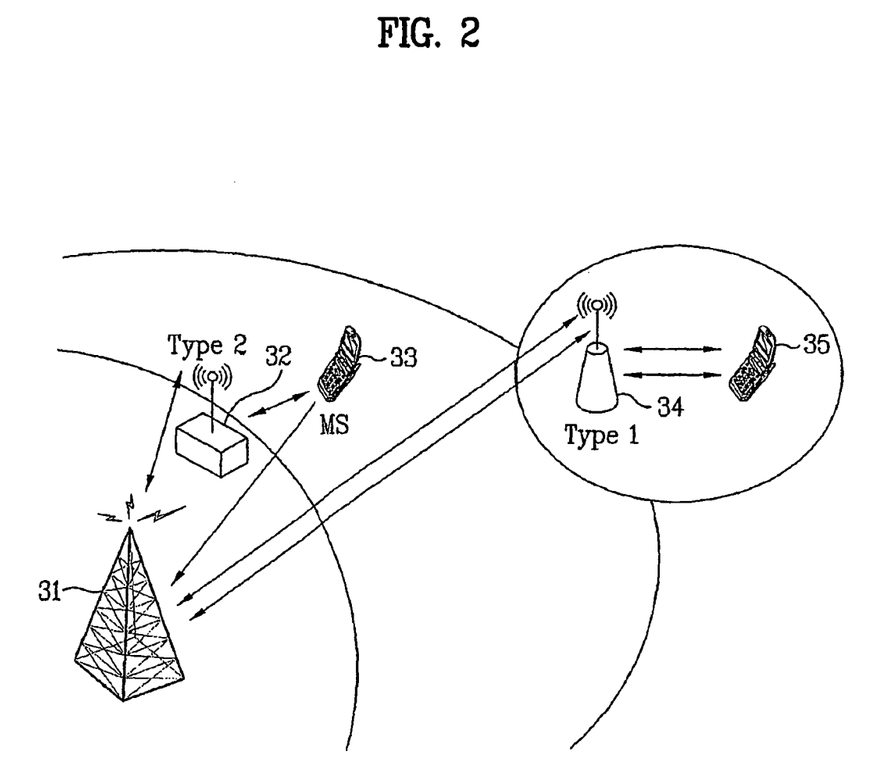
FIG. 2 illustrates the operation of networking using a relay station according to IEEE. 802.16.

FIG. 2 illustrates the operation of networking using a relay station according to the IEEE 802.16. Objects of the relay station can be categorized into service coverage extension of the base station and throughput improvement. The operation of the relay station can be defined differently as shown in FIG. 2 depending on the respective objects.

If the relay station is used for service coverage extension of the base station as shown in relay station type 1 of FIG. 2, a relay station 34 relays all of control messages, which are forwarded from a base station 31 or a mobile station 35, as well as user data exchanged between the mobile station 35 and the base station 31. If the relay station is used for throughput improvement as shown in relay station type 2 of FIG. 2, a relay station 32 relays only user data exchanged between a mobile station 33 and the base station 31 and allows a broadcast type control message of the base station 31 or an uplink control message of the mobile station 33 to be directly exchanged between the mobile station 33 and the base station 31. In this way, data relayed using the relay station may be delayed as compared with data directly exchanged between the mobile station and the base station. The relay station can increase overall throughput by providing excellent signal quality to the mobile station to which the data are relayed and relaying the data to the corresponding mobile station using a suitable coding rate and modulation mode.

In a wireless metropolitan area network (IEEE 802.21 wireless MAN) system, mobile multi-hop relay (MMR) related studies using a relay station are being actively made to achieve two objects such as cell area extension and throughput improvement. However, the detailed system structure and operation of MMR have not been defined until now.

In the aforementioned networking method using a relay station according to the related art, definition of ranging performed to allow the mobile station to perform registration to the base station or periodically maintain synchronization with the base station is very important. Nonetheless, definition of such ranging is unclear. In the MMR network, since the relay station exists between the mobile station and the base station of the existing system, ranging method of a channel between the relay station and the mobile station should be defined when communication through the relay station occurs.

DISCLOSURE OF THE INVENTION

Accordingly, the present invention is directed to a method of performing ranging through a relay station (RS) and supporting thereof, which substantially obviates one or more problems due to limitations and disadvantages of the related art.

An object of the present invention is to provide to a method of performing ranging of a mobile station through a relay station and supporting thereof in a wireless metropolitan area network (wireless MAN) system.

Another object of the present invention is to provide to a method of performing ranging of a mobile station through a relay station and supporting thereof, which is compatible with a related art method of performing ranging between a base station and a mobile station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to the preferred embodiment of the present invention, if ranging is performed in a system which performs communication between a mobile station and a base station through relay of a relay station, the ranging is performed under the leading of the relay station. In other words, if the relay station determines whether ranging between the mobile station and the relay station is required and also determines transmission parameter adjustment values and reports the determined result to the base station, the base station performs the ranging in such a manner that it prepares a message suitable for a specific format and forwards the message to the mobile station through the relay station.

To achieve these objects and other advantages and in accordance with the purpose of the invention, as embodied and broadly described herein, a method of performing ranging through a relay station (RS), which relays communication between a base station and a mobile station, includes receiving ranging response message from the relay station, the ranging response message including at least one parameter adjustment value for ranging, and adjusting transmission parameters using the at least one transmission parameter adjustment value, wherein the at least one transmission parameter value is acquired by the relay station, forwarded to the base station, and included in the ranging response message.

In another aspect of the present invention, a method of supporting ranging in a relay station (RS), which relays communication between a base station and a mobile station, includes a first step of transmitting at least one transmission parameter value for ranging to the base station if ranging between the mobile station and the relay station is required, a second step of receiving ranging response message from the base station, the ranging response message including the at least one parameter adjustment value, and a third step of transmitting the ranging response message to the mobile station.

In other aspect of the present invention, a method of supporting ranging in a relay station (RS), which relays communication between a base station and a mobile station, includes a first step of transmitting at least one transmission parameter value for ranging to the base station, a second step of receiving ranging response message from the base station, the ranging response message including the at least one parameter adjustment value, and a third step of transmitting the ranging response message to the mobile station.

It is to be understood that both the foregoing general description and the following detailed description of the present invention are exemplary and explanatory and are intended to provide further explanation of the invention as claimed.

BEST MODE FOR CARRYING OUT THE INVENTION

The constitution, operation and other features of the present invention will readily be understood by the preferred embodiments of the present invention, which will be described with reference to the accompanying drawings.

Figure 3:
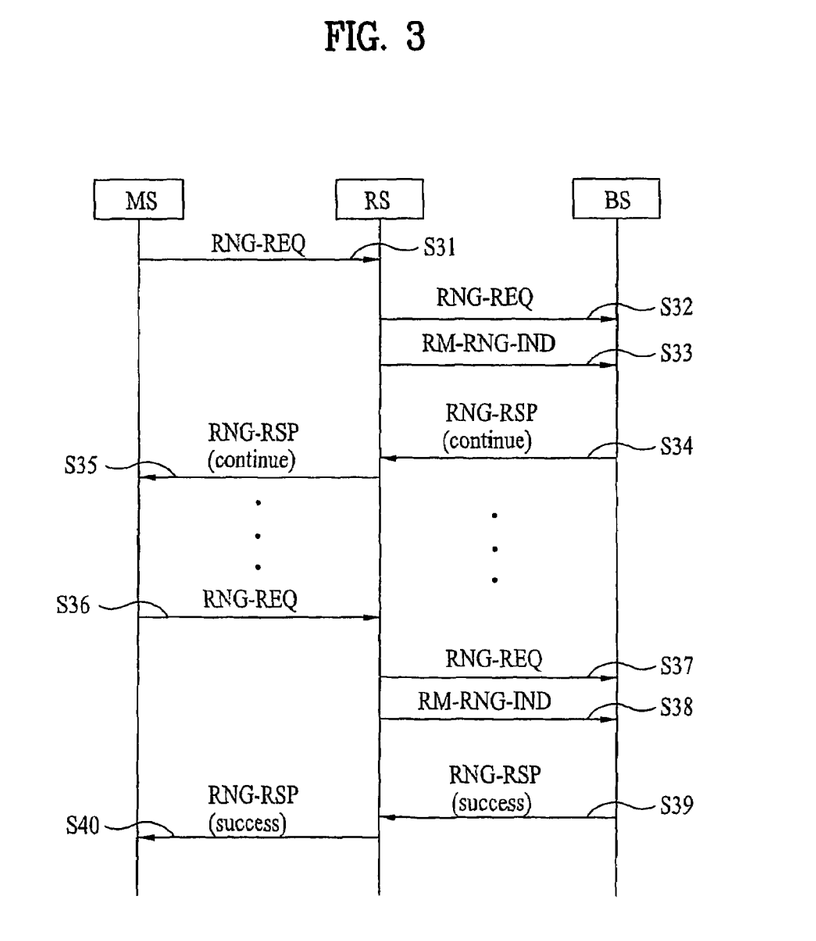
FIG. 3 is a flow chart illustrating a procedure according to one preferred embodiment of the present invention.

FIG. 3 is a flow chart illustrating a procedure according to one preferred embodiment of the present invention. In the embodiment of FIG. 3, technical features of the present invention are applied to initial ranging.

Referring to FIG. 3, a mobile station transmits ranging request message (RNG-REQ) to a relay station in the case that ranging is required (S31). In this case, the case that ranging is required includes, but not limited to, the case that uplink transmission parameters should be adjusted for communication with a new base station such as the case where the mobile station is first powered on or performs handover. The mobile station can select one of slots of ranging subchannels allocated within an uplink frame, and select an initial ranging code to transmit the ranging request message to the base station.

As described above, an OFDMA wireless metropolitan area network (wireless MAN) system performs an uplink bandwidth request and ranging request using CDMA codes to allow the mobile station to adjust uplink transmission parameters. In other words, the base station forwards CDMA code sets for ranging and bandwidth request to the mobile stations in a broadcast type through an uplink channel descriptor (UCD) message. The mobile station optionally selects a suitable ranging code from the CDMA codes acquired from the UCD message and transmits the selected ranging code to the base station through an uplink field allocated for ranging to request ranging.

If the relay station (RS) receives the ranging request message (RNG-REQ) from the mobile station, the relay station relays the ranging request message through an optional slot of the ranging subchannels of a relay station zone (RS Zone) (S32).

The relay station transmits transmission parameter adjustment values required for ranging between the mobile station and the relay station to the base station. The transmission parameter adjustment values include, but not limited to, an offset frequency adjustment value (Offset Frequency Adjust), a timing offset adjustment value (Timing Adjust), and a power level adjustment value (Power Level Adjust). The transmission parameter adjustment values may be transmitted to the base station either by being included in the ranging request message or through a separate message.

Table 10 illustrates an example of a data format of RM-RNG-IND (RS-MS ranging indicator) message in the case that the relay station transmits the transmission parameter adjustment values to the base station through a separate message, i.e., the RS-RNG-IND message, which is different from the ranging request message.

TABLE 10

| Syntax | Size (Byte) | Note |
| --- | --- | --- |
| RM-RND-IND ( ) { | | |
| Indication | 1 | 0: NONE<br>1: Indicate adjustment for ranging between RS and MS<br>The other: reserved |
| If ( Indication == 1) { | | |
| Timing Adjust | 4 | Tx timing offset adjustment (signed 32-bit). |
| Power Level Adjust | 1 | Tx Power offset adjustment (signed 8-bit, 0.25 dB units) |
| Offset Frequency Adjust | 4 | Tx frequency offset adjustment (signed 32-bit, Hz units) |
| Ranging Status | 4 | 1 = continue, 2 = abort, 3 = success, 4 = rerange |
| } | | |
| } | | |

In Table 10, 'Indication' field represents an indicator indicating that the relay station will perform ranging between the mobile station and the relay station. If the 'Indication' field is set to '1,' it means that ranging will be performed between the mobile station and the relay station. The RM-RNG-IND message includes 'Timing Adjust,' Power Level Adjust,' and 'Offset Frequency Adjust' for the transmission parameter adjustment values for ranging and a 'Ranging Status' field which indicates the ranging status. The 'Ranging Status' field indicates whether the transmission parameter values should further be adjusted between the mobile station and the relay station. If the 'Ranging Status' field is set to 'continue,' it means that the transmission parameter values should further be adjusted between the mobile station and the relay station. If the 'Ranging Status' field is set to 'success,' it means that the transmission parameter values do not need to be adjusted any more between the mobile station and the relay station.

The base station which has received the ranging request message RNG-REQ and the RM-RNG-IND message from the relay station generates ranging response message RNG-RSP based on contents of the RM-RNG-IND message and transmits the generated ranging response message RNG-RSP to the relay station (S34). The relay station transmits the ranging response message received from the base station to the mobile station (S35).

The steps S31 to S35 in FIG. 3 correspond to the case where the 'Ranging Status' field is set to 'continue,' and mean that the transmission parameter values should further be adjusted between the mobile station and the relay station. If the mobile station receives the ranging response message from the relay station, wherein the ranging response message includes the "Ranging Status" field set to 'continue,' the mobile station again starts to transmit the ranging request message to the relay station. These steps continue until the mobile station receives the ranging response message which includes the 'Ranging Status' field set to 'success.' The steps S36 to S40 correspond to the case where the mobile station receives the ranging response message which includes the 'Ranging Status' field set to 'success,' and their respective action and features are the same as those of the steps S31 to S35.

Figure 4:
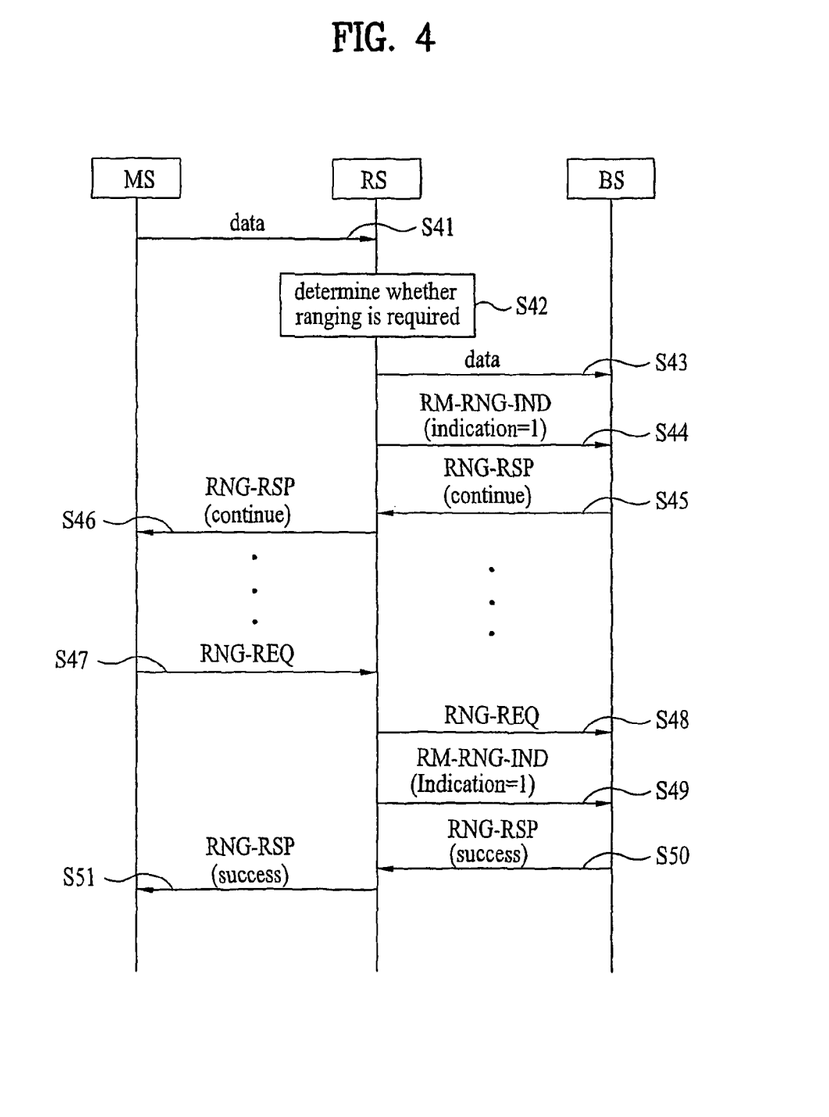
FIG. 4 is a flow chart illustrating a procedure according to another preferred embodiment of the present invention.

FIG. 4 is a flow chart illustrating a procedure according to another preferred embodiment of the present invention. In the embodiment of FIG. 4, technical features of the present invention are applied to periodic ranging. The periodic ranging can be divided into two types. The first type periodic ranging corresponds to the case where the relay station receives data from the mobile station and performs ranging by determining through the received data that the ranging is required. The second type periodic ranging corresponds to the case where the relay station receives the ranging request message from the mobile station and performs ranging.

Referring to FIG. 4, if the mobile station (MS) transmits data to the relay station (RS) (S41), the relay station determines through the received data whether ranging is required (S42). For example, as a result of analysis of the data received from the mobile station, if it is determined that time synchronization exceeds a certain range in view of time, a frequency value allocated to the mobile station exceeds a certain offset value in view of frequency, or a transmission power level is too high or low in view of transmission level, the relay station can determine that ranging is required. A standard for allowing the relay station to determine whether ranging is required can be set in various types while the system is embodied.

In the case that the relay station receives the ranging request message from the mobile station or determines through the data received from the mobile station that ranging is required, the relay station transmits transmission parameter adjustment values required for ranging to the base station. The transmission parameter adjustment values may be transmitted to the base station along with the data received from the mobile station or the ranging request message. Alternatively, the transmission parameter adjustment values may be transmitted through a separate message.

Table 11 illustrates an example of a data format of the RM-RNG-IND message in the case that the relay station transmits the transmission parameter adjustment values to the base station through a separate message, i.e., the RS-RNG-IND message, which is different from the ranging request message.

TABLE 11

| Syntax | Size (Byte) | Note |
|---|---|---|
| RM-RND-IND ( ) { | | |
| Indication | 1 | # 0(LSB)->: NONE |
| | | # 1-> 1: Indicate adjustment for ranging between RS and MS |
| | | # 2-> 1: Report the value of present adjustment threshold to BS |
| | | The other: reserved |

TABLE 11-continued

| Syntax | Size (Byte) | Note |
|---|---|---|
| If (Indication(#1)==1) { | | |
| Timing Adjust | 4 | Tx timing offset adjustment (signed 32-bit). |
| Power Level Adjust | 1 | Tx Power offset adjustment (signed 8-bit, 0.25 dB units) |
| Offset Frequency Adjust | 4 | Tx frequency offset adjustment (signed 32-bit, Hz units) |
| Ranging Status | 4 | 1 = continue, 2 = abort, 3 = success, 4 = rerange |
| } | | |
| If (Indication(#2)==1){ | | |
| Timing Adjust | 4 | Present adjustment threshold value |
| Power Level Adjust | 1 | |
| Offset Frequency Adjust | 4 | |
| } | | |
| } | | |

In Table 11, 'Indication' field represents an indicator indicating that the relay station will perform ranging between the mobile station and the relay station. If the 'Indication' field is set to '1,' it means that ranging will be performed between the mobile station and the relay station. The RM-RNG-IND message includes 'Timing Adjust,' 'Power Level Adjust,' and 'Offset Frequency Adjust' for the transmission parameter adjustment values for ranging and a 'Ranging Status' field which indicates the ranging status. The 'Ranging Status' field indicates whether the transmission parameter values should further be adjusted between the mobile station and the relay station. If the 'Ranging Status' field is set to 'continue,' it means that the transmission parameter values should further be adjusted between the mobile station and the relay station. If the 'Ranging Status' field is set to 'success,' it means that the transmission parameter values do not need to be adjusted any more between the mobile station and the relay station.

If the 'Indication' field is set to '2,' thresholds of the adjustment value fields, which serves as the standard for allowing the relay station to determine whether to transmit the RM-RNG-IND message to the base station, are included in the RM-RNG-IND message. The relay station sets the 'Indication' field of the RM-RNG-IND message to '2' if necessary, so as to transmit the thresholds to the base station. The relay station may transmit the thresholds to the base station through a separate message.

Since the base station already knows the thresholds which the relay station own, if the thresholds should be updated by request of the relay station or by spontaneous judgment of the base station not the request of the relay station, the base station can notify the relay station of the updated thresholds. Table 12 illustrates an example of a message (RS_Threshold message) for allowing the base station to notify the base station of the updated thresholds.

TABLE 12

| Syntax | Size (Byte) | Note |
|---|---|---|
| RS_Threshold { | | |
| Timing Adjust | 4 | Tx timing offset adjustment |
| Power Level Adjust | 1 | Tx Power offset adjustment |
| Offset Frequency Adust | 4 | Tx frequency offset adjustment |
| } | | |

The base station which has received the data or the ranging request message RNG-REQ and the RM-RNG-IND message from the relay station generates ranging response message RNG-RSP based on contents of the RM-RNG-IND message and transmits the generated ranging response message RNG-RSP to the relay station (S44). The relay station transmits the ranging response message received from the base station to the mobile station (S45).

The steps S41 to S46 in FIG. 4 correspond to the case where the 'Ranging Status' field is set to 'continue,' and the steps S47 to S51 correspond to the case where the mobile station receives the ranging response message which includes the 'Ranging Status' field set to 'success.' The respective action and features of these steps are the same as those described with reference to FIG. 3.

Figure 5:
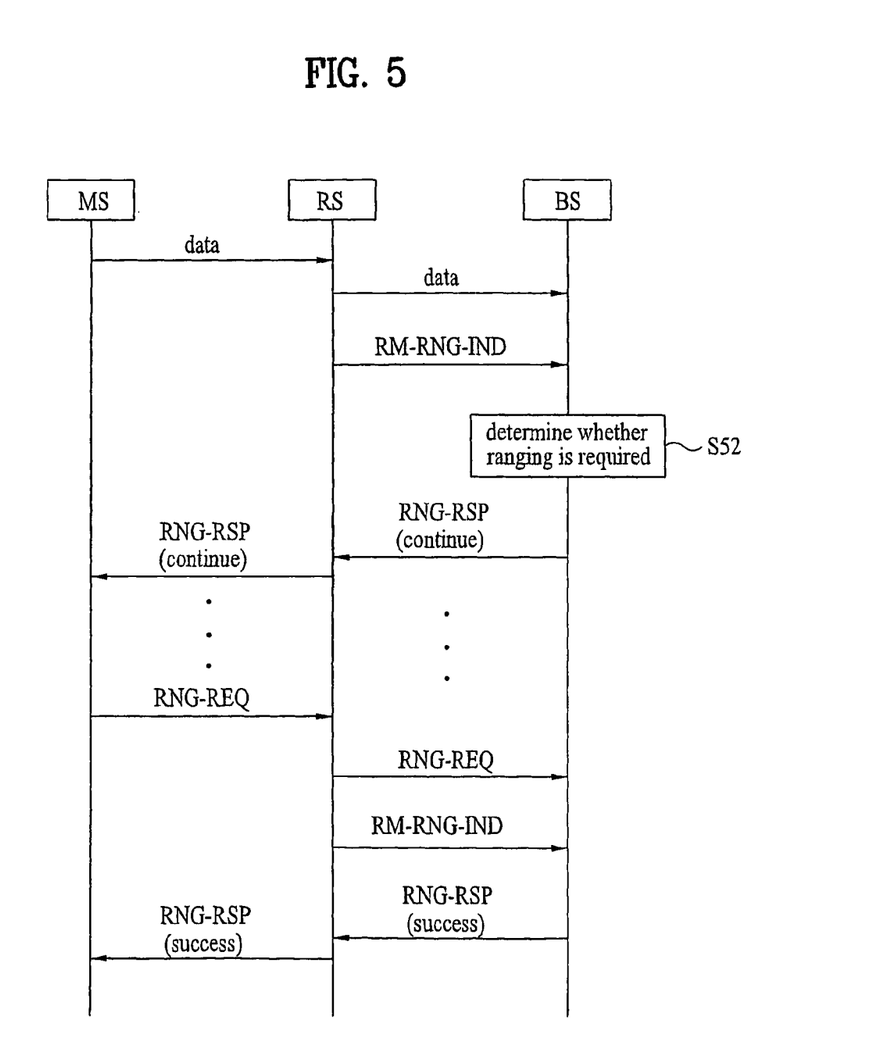
FIG. 5 is a flow chart illustrating a procedure according to other preferred embodiment of the present invention.

FIG. 5 is a flow chart illustrating a procedure according to other preferred embodiment of the present invention. The embodiment of FIG. 5 is almost similar to that of FIG. 4 except that the base station determines whether ranging is required. In other words, if the relay station notifies the base station of the transmission parameter adjustment values periodically per certain time interval (for example, per frame) or non-periodically, the base station directly determines through the transmission parameter adjustment values received from the relay station whether ranging is required (S52). If it is determined that ranging is required, the base station starts ranging through an unsolicited ranging response message (RNG-RSP). Since the other steps are the same as those of FIG. 3 or FIG. 4, their detailed description will be omitted.

As described in the embodiments of FIG. 3 to FIG. 5, although the relay station may transmit the ranging indicator and the transmission parameter adjustment values to the base station through the separate message such as RM-RND-IND message to perform ranging, the relay station may transmit them through the ranging request message RNG-REQ. Table 13 illustrates an example of a data format of the ranging request message which includes the ranging indicator and the transmission parameter adjustment values.

TABLE 13

| Syntax | Size (bits) | Notes |
| --- | --- | --- |
| RNG-REQ_Message_Format( ) { | | |
| Management Message Type = 4 | 8 | |
| Downlink Channel ID | 8 | |
| TLV Encoded Information | variable | TLV specific |
| Indication | 1 | 0: NONE<br>1: Indicate adjustment for Ranging between RS and MS<br>The other: reserved |
| If ( Indication == 1 ) { | | |
| Timing Adjust | 4 | Tx timing offset adjustment (signed 32-bit). |
| Power Level Adjust | 1 | Tx Power offset adjustment (signed 8-bit, 0.25 dB units) |
| Offset Frequency Adjust | 4 | Tx frequency offset adjustment (signed 32-bit, Hz units) |
| Ranging Status | 4 | 1 = continue, 2 = abort, 3 = success, 4 = rerange |
| } | | |
| } | | |

Although the present invention has been described based on the wireless MAN system, the technical spirit of the present invention is not limited to the wireless MAN system. The technical spirit of the present invention can be applied to an arbitrary communication system which uses ranging and the relay station. The term 'mobile station' herein has been used to ensure mobility, like a mobile station for mobile communication or a portable mobile station for Internet.

According to the present invention, the method of performing ranging through a relay station and supporting thereof has the following advantages.

First, the ranging procedure in the communication system which uses the relay station can be defined clearly.

Second, the method of performing ranging according to the present invention can maintain backward compatibility with the ranging procedure between the mobile station and the base station without through the relay station.

Finally, it is possible to more easily perform radio resource management (RRM) within a cell and perform ranging without interference with the relay station.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The technical features of the present invention can be applied to a wireless communication system such as a mobile communication system or a wireless Internet system.

What is claimed is:

1. A method of supporting ranging in a relay station (RS) which relays communication between a base station and a mobile station, the method comprising:
    receiving, from the mobile station, data to be relayed to the base station;
    determining ranging between the mobile station and the relay station is required when at least time synchronization exceeds a certain range in view of time between the mobile station and the RS or a frequency value allocated to the mobile station exceeds a certain offset value in view of frequency based on the received data to be relayed to the base station; and
    transmitting, to the base station, an indicator and at least one transmission parameter value if it is determined that the ranging between the mobile station and the relay station is required;
    wherein the at least one transmission parameter value is at least one transmission parameter adjustment value for ranging to the base station if the indicator is set to a first value, and
    wherein the at least one transmission parameter value is at least one threshold value of the at least one transmission parameter adjustment value if the indicator is set to a second value.

2. The method as claimed in claim 1, wherein the at least one transmission parameter value and the indicator are included in a same message to be transmitted.

3. The method as claimed in claim 1, wherein the at least one transmission parameter adjustment value is periodically transmitted to the base station at a predetermined time interval.

4. The method as claimed in claim 3, wherein the predetermined time interval is set in a unit of a frame.

5. The method as claimed in claim 1, further comprising receiving a ranging response message based on the at least one transmission parameter value from the base station.

6. The method as claimed in claim 5, further comprising receiving a ranging request message from the mobile station in response to the ranging response message if the ranging between the mobile station and the relay station is required.

7. The method as claimed in claim 1, further comprising receiving an unsolicited ranging response message based on the at least one transmission parameter value from the base station if it is determined that the ranging between the mobile station and the relay station is required,     wherein the unsolicited ranging response message includes the at least one transmission parameter adjustment value and a ranging status field set to 'continue'.

8. The method as claimed in claim 1, wherein the at least one transmission parameter value is transmitted to the base station along with the data to be relayed to the base station.

9. The method as claimed in claim 1, further comprising receiving at least one updated threshold value of the at least one transmission parameter adjustment value from the base station.

* * * * *